Feb. 10, 1925.
A. BERMAN
SECTIONAL COUPLING JOINT FOR AUTOMOBILE RADIATORS
Filed April 22, 1922
1,525,437
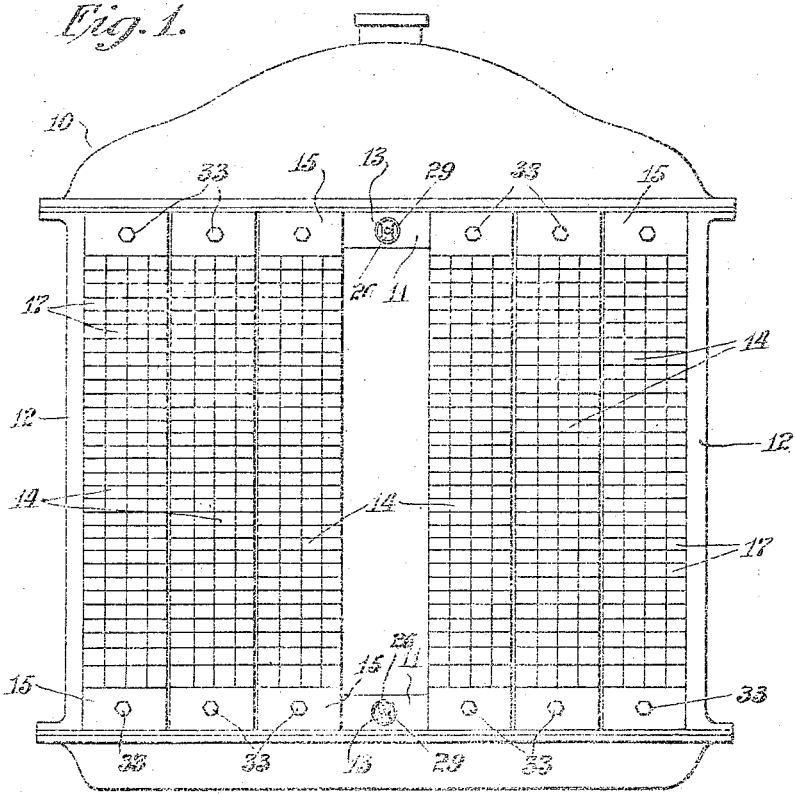
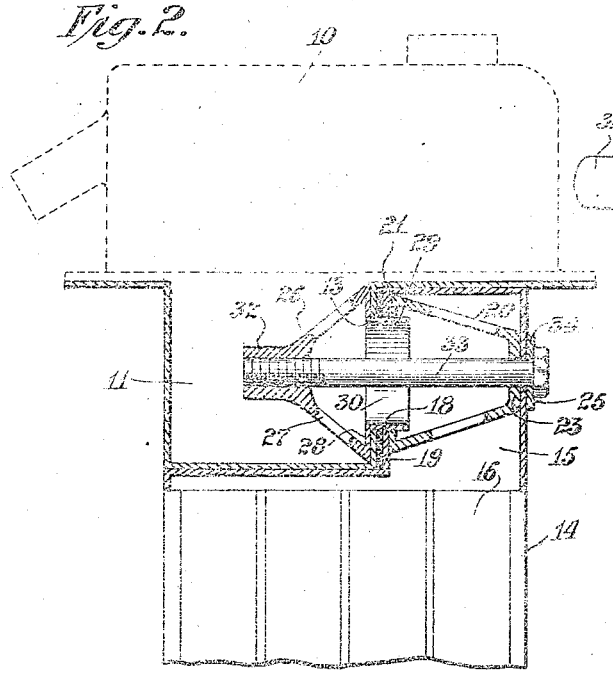
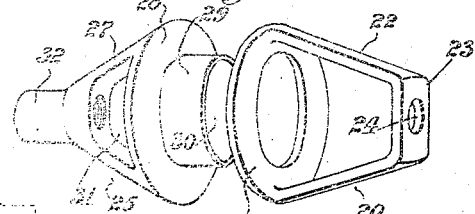
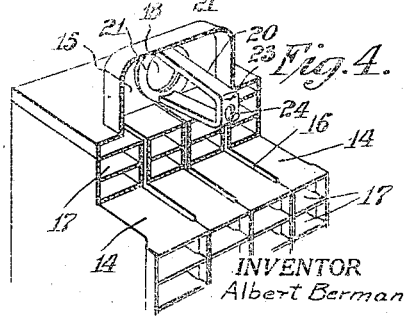
INVENTOR
Albert Berman
BY
his ATTORNEY Patented Feb. 10, 1925.

1,525,437

UNITED STATES PATENT OFFICE.

ALBERT BERMAN, OF BROOKLYN, NEW YORK, ASSIGNOR TO SAUL BERMAN, OF NEW YORK, N. Y.

SECTIONAL COUPLING JOINT FOR AUTOMOBILE RADIATORS.

Application filed April 22, 1922. Serial No. 556,064.

*To all whom it may concern:*

Be it known that I, ALBERT BERMAN, a citizen of the United States, residing at Brooklyn, in the county of Kings and State of New York, have invented certain new and useful Improvements in Sectional Coupling Joints for Automobile Radiators, of which the following is a specification.

My invention relates to a sectional coupling joint, particularly applicable for use with individual units of a sectional automobile radiator, to removably secure such units to the water manifold chambers of the radiator tank and to provide suitable inlet and outlet passages between the manifolds and the separate units whereby water may circulate freely between the elements without danger of leakage at the joints.

In the construction of sectional radiators it is customary to provide projecting ears at opposite ends of the individual units, each ear having a central water passage and bolt receiving openings at opposite sides of the passage. It has been attempted to form a water tight joint between the sections and the tank of the radiator by the use of other packing means between the ears and the water manifold; but, so far as I am aware, this expedient has failed of its purpose, due probably to the difficulty of obtaining equal pressure against the packing at all points about the passages, inasmuch as the clamping action of the bolts is effective only at two fairly widely separated points about the passage. At parts remote from the bolts leakage is likely to occur. The present invention therefore contemplates the provision of a single opening in both the unit and the manifold, which are separated by a gasket, and which are removably secured together through openings by means of a sectional coupling joint of the character hereinafter described, and it is the primary object of the invention to provide a sectional coupling joint which will effectively hold the individual sections in their respective relation to the radiator tank without danger of leakage, and at the same time permit free circulation of the water through the coupling joint into and out of the separate radiator units.

The invention is fully described in the following specification and set forth in the appended claims, and illustratively exemplified in the accompanying drawings, in which Figure 1 is a front elevational view of a radiator tank showing the individual sections in their respective positions and one section omitted; Figure 2 is a substantially transverse sectional view of the upper portion of a radiator section, water manifold, and coupling joint for detachably connecting the two elements together; Figure 3 is a perspective view of the sectional coupling joint; and Figure 4 is a perspective view of a portion of a sectional radiator unit showing parts broken away to show the construction of the water passages and one member of the sectional coupling.

Referring to the drawings, and particularly to the construction of the radiator tank shown in Figures 1 and 2, 10 denotes the permanent radiator tank comprising upper and lower members, both members being provided with manifold chambers 11. The upper and lower members 10 are rigidly supported at their ends and spaced apart from each other by side irons 12, which constitute the side walls of the radiator proper. The manifold chambers 11 extend substantially the entire width of the upper and lower members 10 between the side irons 12, and are disposed on a plane substantially rearward of the face of the radiator itself, so that a shoulder or seat is provided against which the individual sections are seated. The manifold chambers 11 are provided with a plurality of openings 13 in their forward walls through which communication is established between the tank and a series of individual units 14.

The units 14 are assembled in relation to the permanent tank 10 in the manner shown in Figure 1, i. e., side by side, so that water from the tank 10 circulates in a vertical direction and in separate units defined by the sections themselves. The sections comprise upper and lower auxiliary tanks 15 and communicating with both thereof is a plurality of series of tubes 16 arranged between honey comb or any other suitable grid construction 17. The auxiliary tanks 15 are each provided with a single central opening 18 in the rear wall thereof, the said opening being adapted to register with one of the openings 13 in the manifold chambers 11. A gasket 19 having a central opening therein is placed between the adjacent surfaces of the manifold chamber and the auxiliary tanks 15, as shown in Figure 2. In order to reenforce the opposite walls of the auxiliary tanks 15 against external pressure I have provided a conically shaped cage 20, forming one unit of the sectional coupling, and having an annular flat base portion 21, adapted to reenforce the marginal portion of the material surrounding the opening 18. The opposite end of the cage 20 is formed by a strap portion 22 having its ends integral with the annular portion 21, the outstanding portions of the strap 22 being inclined toward the axis of the cage 20 and terminating in a transverse end section 23. The section 23 is provided with an opening 24 axially aligned with the opening in the base portion 21. It will be noted, with reference to Figure 2, that the cage 20 is substantially the width of the inside dimension of the auxiliary tank 15 and in the course of manufacture it is desirable to secure together the adjacent surfaces of the base portion 21 of the cage 20 and the inside surface of the auxiliary tank 15 adjacent the opening 18. This may be accomplished by properly locating the cage 20 in the tank 15 and then clipping both members into prepared solder. The auxiliary tanks 15 are further provided with a series of relatively small bolt receiving openings 25 in the outside walls thereof, the said openings 25 being axially aligned with the openings 18 in the opposite walls of the tanks and also in register with the openings 24 in the smaller ends of the cage 20.

In order to detachably secure the sections 14 in position with relation to the permanent tank 10 and at the upper and lower ends thereof, coupling joints 26 forming the other element of the sectional couplings are mounted in the manifold chambers 11 of the tank 10 at the opening 13. Each coupling comprises a cage having a frustro conical body portion 27 provided with an annular flat bearing surface 28 at its base adapted to bear against and to be secured to the inner surface of the forward wall of the chamber 11. The forward side of the portion 28 is provided with an integral cylindrical section 29 which projects through the registered openings 13 and 18, and extends well into the auxiliary tank 15 after projecting through the opening in the portion 21 of the cage 20. The diameter of the cylindrical section 29 is such as to fit closely the openings 13 and 18. The cylindrical section is virtually a shell having a through bore 30 axially aligned with the axis of the openings 13, 18 and 25 and is adapted to establish communication between the manifold chamber 11 and the auxiliary tank 15. The conical portion of the body 27 is provided with a transverse through opening 31 communicating at opposite ends with the interior of the manifold chamber 11 and receiving the inner terminus of bore 30, at its midportion. The reduced end of the body 27 terminates in an axially bored nipple 32, the bore of which is threaded and axially aligned with the coupling joint 26. In order to draw the auxiliary tank 15 tightly against its seat in the manifold chamber 11 and to force the adjacent faces of the elements into closer relation with each other and to compress the gasket 19 therebetween, a bolt 33 is inserted through the openings 24 and 25 in the front wall of the tank 15 and adjacent portion of the strap 22, and its threaded end screwed into the threaded bore of the nipple 32. As the bolt 33 is tightened the head portion will seat against a washer 34 disposed between the head portion and the face of the tank 15, as illustrated in Figure 2. It will be apparent that by tightening the bolt 33, the reenforced peripheral marginal face of the auxiliary tank 15 will be forced against the gasket 19 supported against the similar reenforced marginal portion of the manifold chamber 11, thereby forming a substantially water tight joint between the permanent tank 10 and the section 14.

The operation of removing and replacing a section is as follows:—Assuming that the portion of the section 14 shown in Figure 2 is to be removed from the permanent tank 10, the bolt 33 is unscrewed from the nipple 32 by rotating the head of the bolt by means of a wrench or other tool. After removing both the upper and lower bolts in this manner the section 14 may be drawn forwardly and detached from the manifold chambers 11 and permanent tank 10. To replace the parts position the section 14 so that the openings 18 will register with the opening 13 and then screw the bolts 33 into the nipples 32 until the auxiliary tanks 15 at each end of the section 14 are seated against the gaskets 19 and manifold chambers 11.

With the particular construction above described it will be apparent that an unobstructed passage is maintained through the sectional coupling from the manifold chamber 11 to the interior of the adjacent auxiliary tank 15 and section 14. It will also be apparent that due to the axial pull resulting from tightening the bolt 33 with respect to the coupling joint 26, the pressure against the gasket 19 will be evenly distributed whereby the joint is substantially sealed against possible leakage.

Having fully described my invention what I claim and desire to secure by Letters Patent is:—

1. The combination with a tank and separable radiator unit, of a coupling of the character described, comprising adjustable sections disposed at opposite sides of adjacent walls of the tank and radiator unit, said sections comprising annular members provided with projecting straps, and central openings to open communication between the tank and the radiator unit, one of said members being provided with a flange adapted to telescope within the opening in the other member, and means for adjusting said sections relatively of each other to bring the adjacent walls of the tank and radiator unit together to form a joint, said straps being provided with aligned openings to receive the said means.

2. The combination of elements as claimed in claim 1, in which one of said members is adapted to be disposed between opposite walls of the tank and whose strap has a transverse end portion provided with an opening, and in which the other member's strap projects into the radiator and has a threaded bore at the end thereof, the said means for adjusting the said sections comprising a bolt the head of which is seated against the tank wall adjacent the opening in the first strap and the stem portion thereof being disposed through the openings and adapted to be engaged by the threads of the opening in the second strap, substantially as described.

In testimony whereof I affix my signature.

ALBERT BERMAN.